US012320704B2

(12) United States Patent
Hong et al.

(10) Patent No.: US 12,320,704 B2
(45) Date of Patent: Jun. 3, 2025

(54) FOURIER TRANSFORM SPECTROMETER

(71) Applicant: Obsidian Sensors, Inc., San Diego, CA (US)

(72) Inventors: John Hong, San Diego, CA (US); Bing Wen, San Diego, CA (US); Sean Andrews, San Diego, CA (US); Heesun Shin, San Diego, CA (US); Edward Chan, San Diego, CA (US); Tallis Chang, San Diego, CA (US); Ming Ying, San Diego, CA (US)

(73) Assignee: Obsidian Sensors, Inc., San Diego, CA (US)

( * ) Notice: Subject to any disclaimer, the term of this patent is extended or adjusted under 35 U.S.C. 154(b) by 282 days.

(21) Appl. No.: 18/121,446

(22) Filed: Mar. 14, 2023

(65) Prior Publication Data
US 2023/0288258 A1 Sep. 14, 2023

Related U.S. Application Data

(60) Provisional application No. 63/319,716, filed on Mar. 14, 2022.

(51) Int. Cl.
*G01J 3/45* (2006.01)
*G01J 3/02* (2006.01)
*G02B 6/293* (2006.01)

(52) U.S. Cl.
CPC .............. *G01J 3/45* (2013.01); *G01J 3/0297* (2013.01); *G02B 6/2935* (2013.01)

(58) Field of Classification Search
CPC .......... G01J 3/45; G01J 3/0297; G01J 3/0205; G01J 3/0259; G01J 3/4531; G02B 6/2935; G02B 6/12002; G02B 6/12004; G02B 6/13
See application file for complete search history.

(56) References Cited

U.S. PATENT DOCUMENTS

| 10,900,838 | B1 * | 1/2021 | Podmore | G01J 3/1895 |
| 2014/0125983 | A1 * | 5/2014 | Nitkowski | G01J 9/02 356/450 |
| 2017/0227399 | A1 * | 8/2017 | Hu | G02F 1/3136 |
| 2020/0256728 | A1 * | 8/2020 | Kita | G02F 1/212 |

* cited by examiner

*Primary Examiner* — Edwin C Gunberg
*Assistant Examiner* — Richard O Toohey
(74) *Attorney, Agent, or Firm* — Procopio, Cory, Hargreaves & Savitch LLP

(57) ABSTRACT

Systems and methods for spectrometry are disclosed. In some embodiments, the system comprises a Fourier Transform Spectrometer (FTS) comprising a waveguide and a delay element. In some embodiments, the method comprises determining a power spectral density of an input optical signal via the FTS.

20 Claims, 12 Drawing Sheets

FOURIER TRANSFORM SPECTROMETER

CROSS-REFERENCE TO RELATED APPLICATIONS

This application claims benefit of U.S. Provisional Application No. 63/319,716, filed Mar. 14, 2022, the entire disclosure of which is herein incorporated by reference for all purposes.

FIELD

This disclosure generally relates to systems and methods for spectrometry.

BACKGROUND

It may be desirable for a spectrometer to increase spectral resolution. For example, increased spectral resolution may improve measurements for space applications (e.g., measurement of masses of temperate terrestrial planets). It may also be desirable for a spectrometer to reduce in size, allowing the spectrometer to be more suitable in situations where more stability may be required (e.g., a spectrometer deployed on a space vehicle).

SUMMARY

Systems and methods for spectrometry are disclosed. In some embodiments, the system comprises a Fourier Transform Spectrometer (FTS) comprising a waveguide and a delay element. In some embodiments, the method comprises determining a power spectral density of an input optical signal via the FTS.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Figure 1:
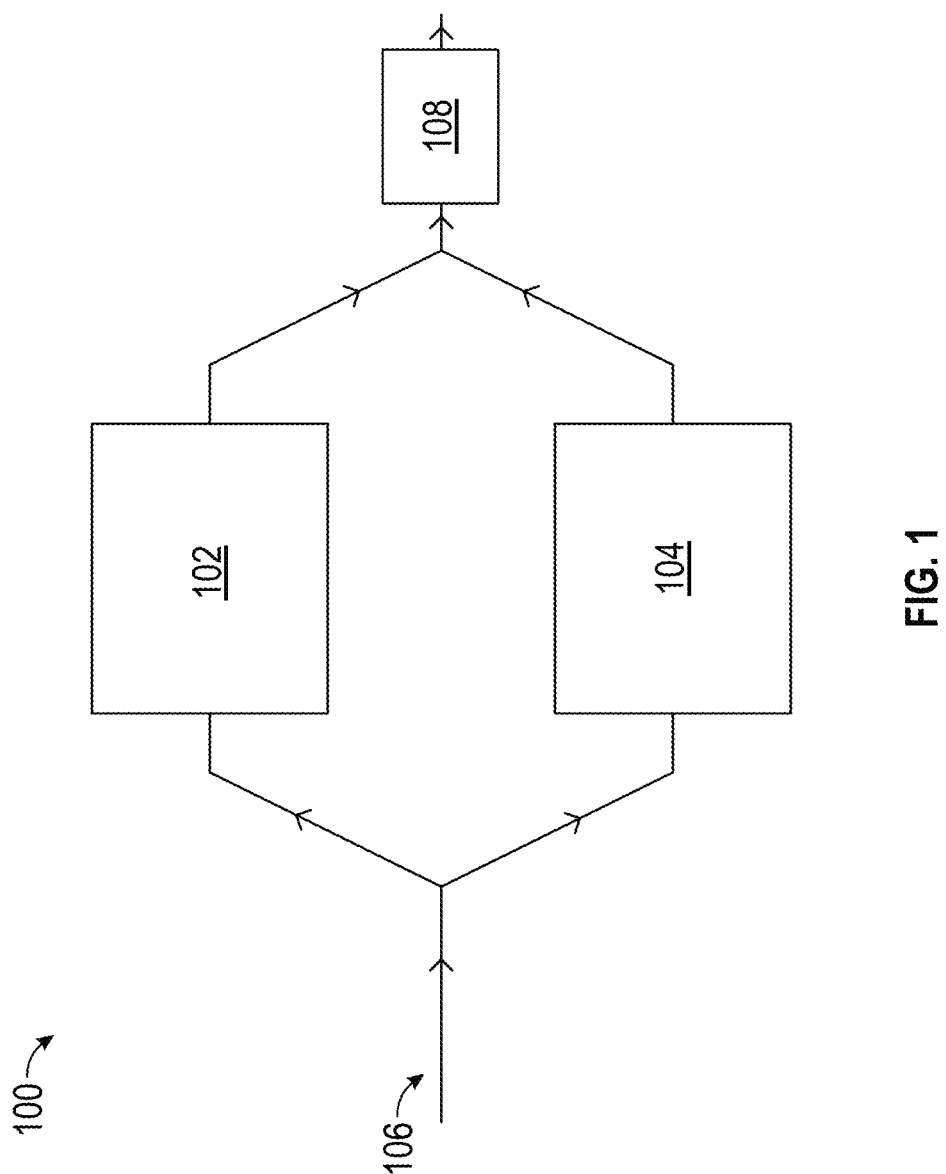
FIG. 1 illustrates an exemplary system, in accordance with embodiments of this disclosure.

FIG. 1 illustrates an exemplary system 100, in accordance with embodiments of this disclosure. In some embodiments, the system 100 comprises a block diagram of a FTS. In some embodiments, the system 100 comprises a two-beam interferometer.

As illustrated in FIG. 1, in some embodiments, the system 100 is configured to receive an optical field amplitude s(t) at input 106, whose spectrum is to be measured is sheared into two replicas with each delayed in time and subsequently recombined at output 108. In some embodiments, the combined field is square-law detected and integrated in time to yield a number for each unique delay $t_1$-$t_2$. In some embodiments, the resulting array of numbers constitute an interferogram, which is equivalent to the autocorrelation function of the field amplitude. In some embodiments, by the Wiener-Khinchin theorem, the Fourier Transform of the interferogram is the desired power spectrum of the input signal. In some embodiments, the interferogram comprises a set of timing differences (e.g., the delay $t_1$-$t_2$). In some embodiments, the architecture of system 100 is cast in the form of a Michelson interferometer as a combination of a beamsplitter, a fixed mirror, a movable mirror, and two photodetectors.

In some embodiments, the system 100 comprises an FTS, and the FTS is configured to achieve a spectral resolution of R>100,000 in spectral band 400 nm-900 nm.

In some embodiments, the FTS occupies a 12 mm×13 mm of area on a photonic chip with a solid-state variable optical path difference (OPD) implemented with an array of MEMS devices, as described in more detail herein. For example, as illustrated, the system 100 comprises delay elements 102 and 104 for generating the OPD. In some embodiments, the FTS is configured to provide 100,000 resolved OPD steps for achieving a desired spectral resolution. In some embodiments, a photonic waveguide fabrication process may be integrated with the disclosed micromechanical system (MEMS) manufacturing process. In contrast, some more traditional FTS may not be scaled to the performance levels needed by some applications (e.g., for measurements in space applications). In some embodiments, the disclosed FTS' small, integrated form allows for more manageable environmental control, which provides more stability, compared to larger table-top instruments that may require the support of more hefty vacuum chambers.

In some embodiments, the disclosed systems and methods advantageously allow a total OPD of 65 mm to be achieved in single-mode integrated photonics. In some embodiments, the system 100 has a variable OPD requirement for each arm of 32.5 mm, which may be a design target of the system 100.

In some embodiments, ignoring bias terms, the interferogram output is described by $$I(x) \propto \int_0^\infty S(\sigma)[1+\cos(2\pi\sigma x)]d\sigma \qquad (1)$$

where S(s) is the power spectral density of the input signal s(t), s is the wavenumber in cm$^{-1}$ and x is OPD variable. Since I(x) is measured for a range of OPD, the inversion of this integral may result in an imperfect spectral estimation. For a given FTS, the measurement limitations may be the highest frequency that can be processed alias-free, which may be limited by the resolution of the OPD (e.g., the smallest step in the relative delay). The spectral resolution achievable by the spectrometer may be limited by the longest OPD that can be accommodated. The smallest step in relative delay may be expressed, respectively, by the highest frequency and frequency resolution $$\sigma_{Max} = \frac{1}{\delta x}, \delta\sigma = \frac{1}{OPD_{Max}} \qquad (2)$$

and the FTS parameters are expressed as follows.

$$\delta x = \frac{1}{\sigma_{Max}} = \lambda_{Min} = 400 \text{ nm}, \qquad (3)$$

$$OPD_{Max} = \frac{1}{\delta\sigma} = \frac{1}{\sigma_0}\left(\frac{\sigma_0}{\delta\sigma}\right) = \frac{R}{\sigma_0} = \frac{100,000}{\left(\frac{1}{650 \text{ nm}}\right)} = 65 \text{ mm}$$

In some embodiments, spectral resolution exceeding 100,000 operating across the visible/near-infrared (NIR) spectrum advantageously enables more precise measurements (e.g., characterization of earth analogs orbiting solar-type stars through radial velocity measurements). In some embodiments, the disclosed systems and methods may address challenges posed by mission concepts where the demands of space deployment may not allow bulkier instruments.

In some embodiments, a system comprises two FTSs. In some embodiments, the two FTSs are co-integrated on a same platform with an input filtered into two sub-bands. In some embodiments, the system comprises a substrate comprising glass (e.g., n=1.5) and a waveguide core comprising a denser material (e.g., n=1.7) in a background of the glass material. The dispersion aspects of the material (e.g., silicon oxynitride, a SiOxNy material), which may influence the parameters of the waveguide, may be considered for some embodiments. In some embodiments, the substrate for the waveguide comprises aluminoborosilicate glass.

Some instruments may be made using bulkier optical components to measure a more complex spectra, ranging from laboratory instruments to room-filling systems. A parameter for setting the resolution of a spectrometer may be a range of optical path difference that can be scanned (e.g., the size of the measured autocorrelation support). Also, the resolution with which the optical path difference can be stepped may determine the spectral range of the measurement. The disclosed systems and methods may advantageously address the problem of maintaining accuracy of the mirror scan while minimally impacting underlying fringe visibility and of bulkier system size. These problems may pose challenges for environmental controls during the process for determining power spectral density of an input signal.

The disclosed systems advantageously may support the instruments using performance parameters that are used for ground-based telescopes. Additionally, because the disclosed systems may be manufactured at a lower cost per unit area of device (e.g., compared to existing FTS systems), the systems may advantageously support higher volume applications (e.g., medical applications, consumer electronics, spectroscopy performed in real time in the molecular fingerprint regions of the infrared used for diagnosis and analysis, distinguish between pathogens using a lower cost device, pharmaceutical, molecular diagnostics, personalized medicine, LiDAR devices, telecommunication systems).

It should be appreciated that FTS may refer to similar systems or devices having a different name, such as Fourier Transform Spectrograph.

Figure 2:
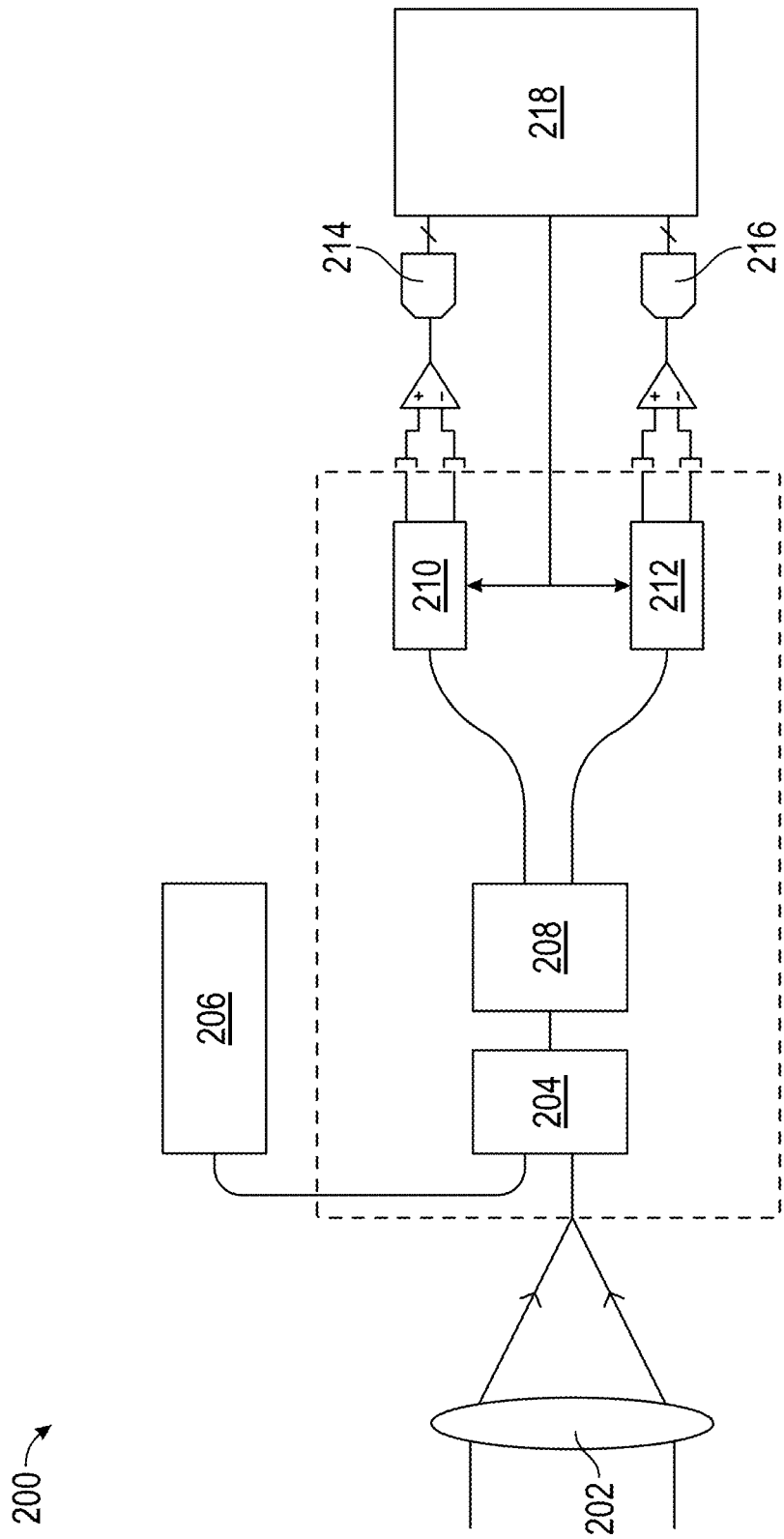
FIG. 2 illustrates an exemplary system, in accordance with embodiments of this disclosure.

FIG. 2 illustrates an exemplary system 200, in accordance with embodiments of this disclosure. In some embodiments, FIG. 2 illustrates an example system layout of an FTS where the polarized input light is split into two spectral channels. In some embodiments, the system 200 comprises an input 202, a switch 204 coupled to a laser 206, a filter 208, a first FTS 210, and a second FTS 212. In some embodiments, the laser 206 comprises a tunable laser configured to provide an output corresponding to a band of operation associate with the system 200 (e.g., 400-900 nm). In some embodiments, each of the FTS outputs couples to an amplifier that is coupled to an analog-to-digital converter (ADC) (e.g., ADCs 214, 216) for further processing by, for example, another electronic device (e.g., electronic device 218). In some embodiments, the system 200 comprises a processor for performing the methods disclosed herein. For example, the processor is configured to perform the disclosed methods for determining a power spectral density of an input optical signal.

In some embodiments where input light is received from a telescope, the light from the telescope may not be polarized, and so two identical systems are configured to serve each polarization input. In some embodiments, there are thus 4 FTS devices in an overall system (2 polarizations×2 spectral channel). In some embodiments, the integrated waveguides operate on single polarization, such that the input light splits into two orthogonal polarization components, each being processed by the system 200. Examples of the waveguides are described in more detail herein. The guided light goes through the filter 208 to be split into two overlapping bands. In some embodiments, the low band covers 600-900 nm of wavelength, and the high band covers 400 to 640 nm (e.g., providing some overlap between the bands). It is understood that these bands are exemplary. As illustrated, the two bands of light are provided to FTSs 210 and 212.

For example, the input signal may be given by x(t) whose Fourier Transform is X(n), and the physical length of a given waveguide length (e.g., an arm of system 100 or system 200) can be varied. In some embodiments, the corresponding correlator output at a given length difference $D_2-D_1$ corresponding to a free space time difference $t=t_2-t_1$ is given by $$y(\tau_1,\tau_2) = \iint_{-\infty}^{\infty} dv_1 dv_2 X(v_1) X^*(v_2) [\int_0^T e^{j2\pi(v_1-v_2)t} dt] e^{j2\pi(n(v_2)v_2\tau_2 - n(v_1)v_1\tau_1)} \qquad (5)$$

where n(v) is the effective refractive index of the waveguide and the integral in the brackets represents the time integration performed to yield each output of the interferogram. In some embodiments, if this time scale is longer than the reciprocal of spectral feature widths (e.g., milliseconds of integration compared to microseconds to nanosecond duration), then it can be treated as a delta function to yield a simpler interferogram expression, as shown below.

$$y(\tau) = \int_{-\infty}^{\infty} dv_1 |X(v_1)|^2 e^{j2\pi n(v_1)v_1 T} \qquad (6)$$

As shown, there is a difference between (6) and the ideal FTS of Equation (1). In some embodiments, for the second order dispersion of interest of this example and for some dispersions (e.g., monotonically increasing refractive index as a function of frequency), the integral equation is inverted with a Fourier Transform kernel likewise scaled by the same function n(v). It can be shown that $$|X(v)|^2 = \int_{-\infty}^{\infty} d\tau y(\tau) e^{j2\pi n(v) v \tau} \quad (7)$$

This analysis shows that a way to measure the dispersion function n(v) across the band of interest and a technique to modulate the optical path length across a larger range of OPD may be desired. Returning to FIG. 2, in some embodiments, the laser 206 (e.g., a tunable laser, a calibrated laser) is configured to provide this interrogation via switch 204 that can select between the light from input 202 and light from the laser. By collecting the interferogram for each wavelength selected in the laser, an accurate characterization of n(v) can advantageously be made.

Figure 3A:
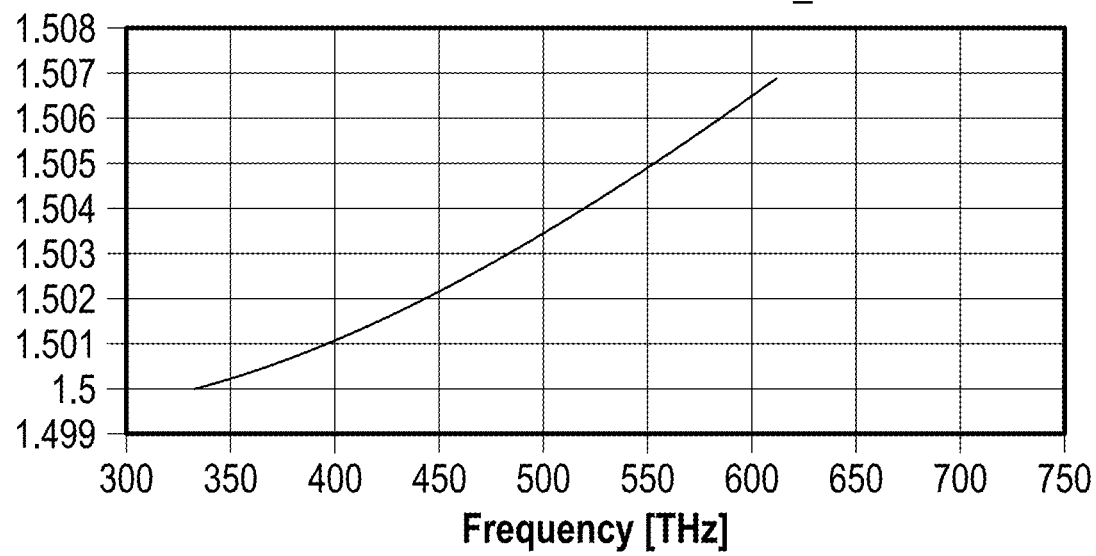
FIGS. 3A and 3B illustrate dispersion of exemplary waveguides, in accordance with embodiments of this disclosure.
Figure 3B:
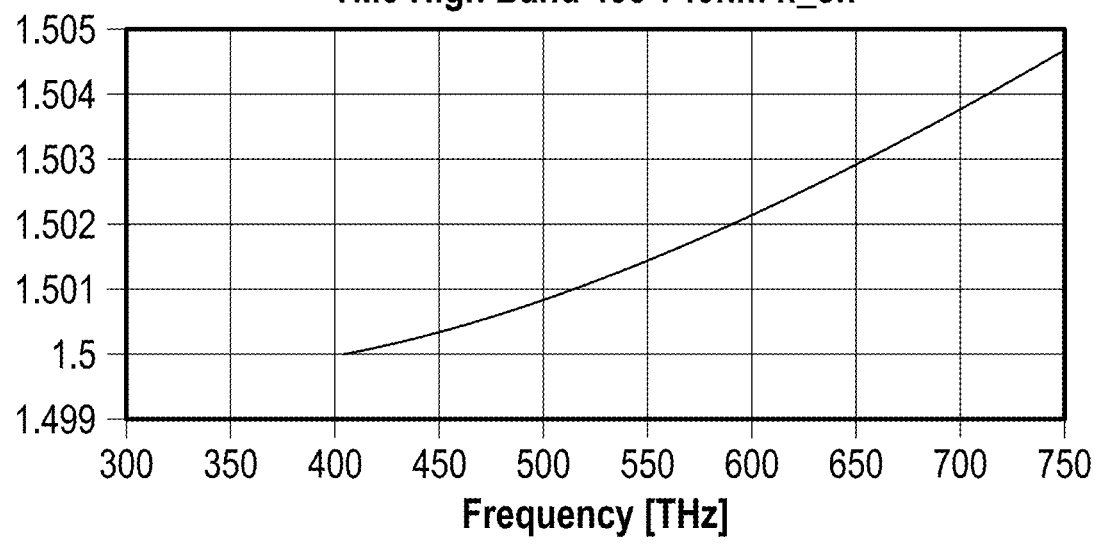

FIGS. 3A and 3B illustrate dispersion of exemplary waveguides, in accordance with embodiments of this disclosure. In some embodiments, FIG. 3A illustrates the dispersion of a low-band waveguide, for example, from 490-900 nm, shown as a function of frequency n which is fit to a quadratic by the equation $$n_{\it eff}(v) = n_0 + av + bv^2, \; n_0 = 1.499546, \; a = -1.1 \times 10^{-5} [\text{THz}^{-1}], \; b = 3.84 \times 10^{-8} [\text{THz}^{-2}] \quad (4)$$

FIG. 3B illustrates the dispersion of a high-band waveguide, for example 400-740 nm. Examples of the waveguides are described in more detail herein.

Figure 4A:
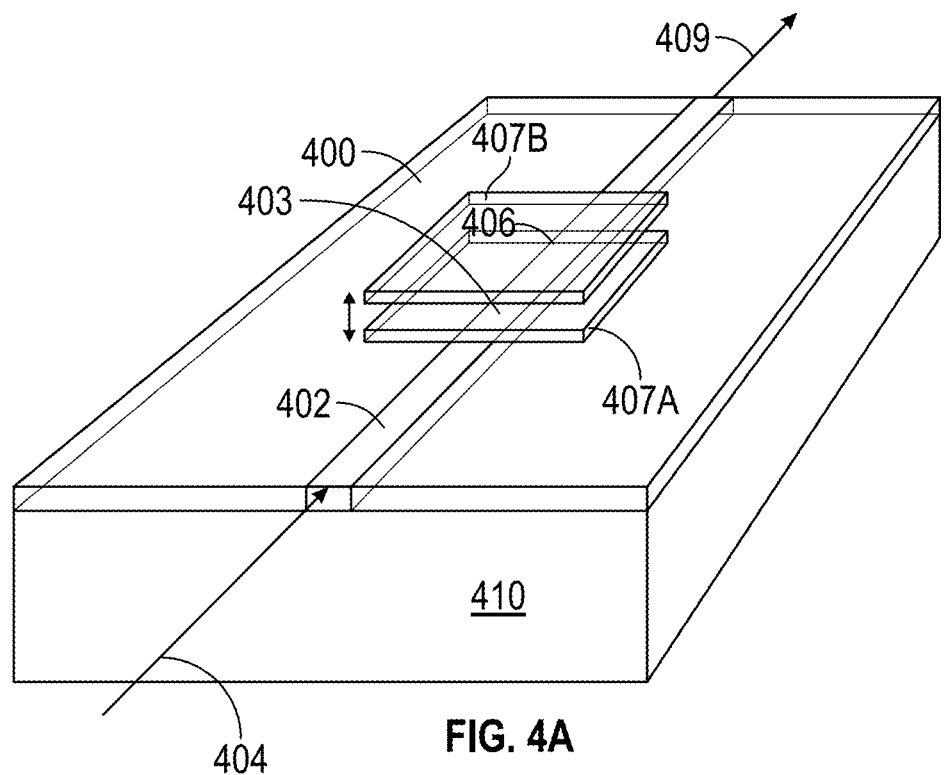
FIGS. 4A and 4B illustrate exemplary waveguides, in accordance with embodiments of this disclosure.
Figure 4B:
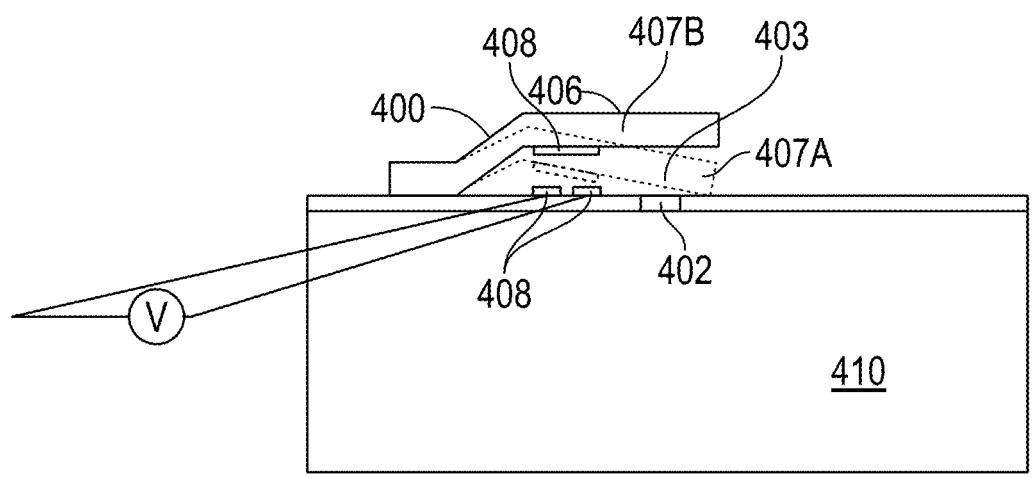

FIGS. 4A and 4B illustrate exemplary waveguides, in accordance with embodiments of this disclosure. As illustrated, FIG. 4A illustrates an embodiment of a waveguide 402 in a first view, and FIG. 4B illustrates the waveguide 402 in a second view. In some embodiments, the waveguide 402 is part of an FTS disclosed herein.

In some embodiments, an FTS disclosed herein comprises a delay element 400 that can be programmably loaded with a cladding section and a waveguide 402 (e.g., single mode optical waveguide). In some embodiments, the waveguide 402 comprises a programmable optical path length (OPL) waveguide. As illustrated in FIG. 4A, an input optical signal 404 enters the waveguide 402 and emerges with an output optical signal 409, which is a delayed version of the input optical signal 404.

In some embodiments, the delay element 400 comprises an air cladding 403 and a transparent dielectric slab 406 of length $L_{slab}$, refractive index $n_{slab}$, and thickness $T_{slab}$ positioned at a top side (e.g., a direction away from the substrate 410) of the waveguide 402. In some embodiments, $n_{slab}$ is 1.5. In some embodiments, the dielectric slab 406 is electrically actuated between two or more positions (e.g., an activated position 407A, an inert position 407B). In some embodiments, the activated position 407A is a distance that is less than a lower-bound wavelength of an optical signal (e.g., 400 nm) above the waveguide surface, and the inert position 407B is multiple wavelengths above the surface, so that the evanescent fields of the guided wave either interact with the slab 406 or do not interact with the slab 406.

In some embodiments, in the activated position, the phase velocity of the guided mode is slowed and the extent of this slowing depends on the thickness of the slab and its refractive index in relation to that of the guiding core. FIG. 4B illustrates a notional approach on the actuation mechanism according to some embodiments. In some embodiments, electrodes 408 are deposited on a side of a dielectric cantilever that is part of the slab 406 and on the substrate 410. The electrode on the cantilever is floating while the electrode or electrodes on the substrate 410 are provided with a voltage. The electric field between the floating electrode and the substrate electrodes causes a closing force on the cantilever. The actuated position (e.g., corresponding to the activated position 407A) is shown by the dotted outline. In some embodiments, the substrate 410 comprises a glass substrate and thin film transistors that can be fabricated on the glass substrate (e.g., using methods disclosed herein), which can provide multiplexing and buffering functions that may facilitate driving and controlling of the actuators.

Figure 5A:
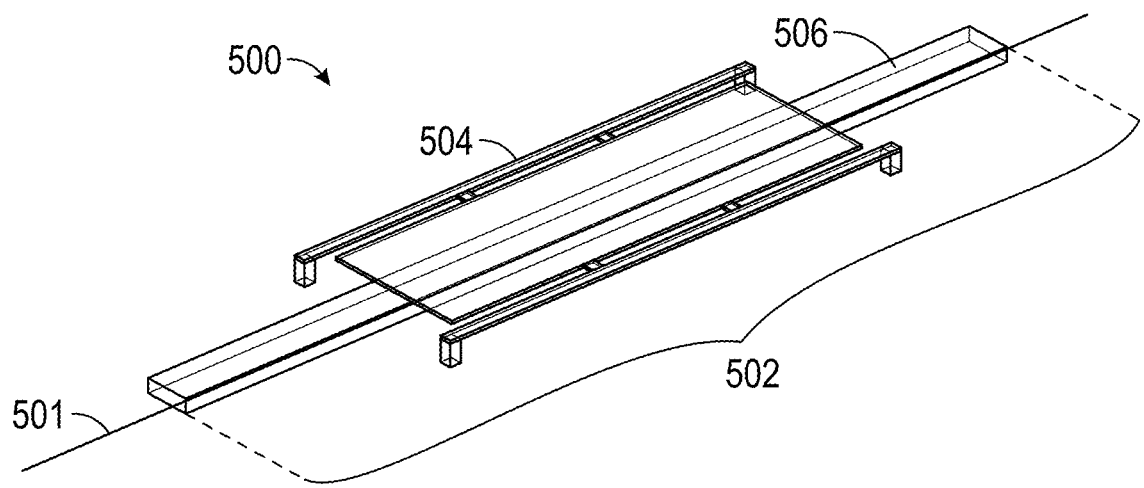
FIGS. 5A and 5B illustrate exemplary waveguides, in accordance with embodiments of this disclosure.
Figure 5B:
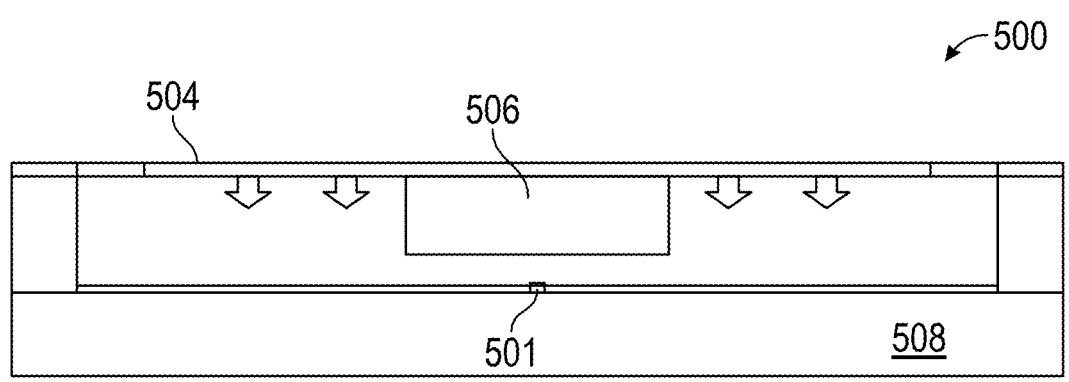

FIGS. 5A and 5B illustrate exemplary waveguides 501, in accordance with embodiments of this disclosure. In some embodiments, an FTS disclosed herein comprises delay element 500 and the waveguide 501. In some embodiments, the delay element 500 comprises an optical cladding section 502 that is electrostatically actuated into place on a top side (e.g., a direction away from the dielectric slab 506) of the waveguide 501 with a MEMS structure for a programmable OPL, as shown in FIGS. 5A and 5B. In some embodiments, the optical cladding section 502 is supported by mechanical suspension 504 and comprises dielectric slab 506. In some embodiments, the mechanical suspension 504 is manufactured via a MEMS manufacturing method disclosed herein. In some embodiments, the length of each cladding segment is 500 um to maintain flatness when engaged with the waveguide 501. In some embodiments, the cladding slab is 2 um thick, 10 um wide and suspended at least 1 um above the waveguide in the unswitched state (e.g., at an inert position).

In some embodiments, first electrodes are disposed on the optical cladding section 502 facing the substrate 508, and second electrodes are disposed on the substrate 508 facing the first electrodes. Generation of an electric field between the first and second electrodes (e.g., by applying a voltage between the first and second electrodes) causes an electrostatic force that would actuate the dielectric slab 506 away or towards the waveguide 501 to adjust the phase velocity of the optical signal traveling in the waveguide. In some embodiments, electrostatic force is applied to the periphery of the mechanical suspension, for example, as indicated by arrows in FIG. 5B. In some embodiments, the waveguide 501 is positioned on a substrate comprising a glass substrate and thin film transistors that can be fabricated on the glass substrate (e.g., using methods disclosed herein), which can provide multiplexing and buffering functions that may facilitate generation of the voltage for causing the electrostatic force.

In some embodiments, the materials and dimensions of the mechanical suspension 504 (e.g., a metal film) are optimized independently of the optical slab to improve electrostatic actuation efficiency. In some embodiments, the dielectric slab 506 is placed in the center of the mechanical suspension 504 for increased flatness from symmetry (e.g., such that center of the dielectric slab 506 is parallel with a center of the waveguide 501 along an axis of the waveguide 501). In some embodiments, the ends of the dielectric slab 506 are apodized to reduce losses at those interfaces.

In some embodiments, to avoid stiction of the cladding plate with the delay element 400 or 500 when actuated, mechanical features such as bumps are added in the area away from the waveguide region.

Although the disclosed waveguides are described with respect to an FTS, it should be appreciated that the disclosed waveguides may be used on other devices or systems.

Figure 6:
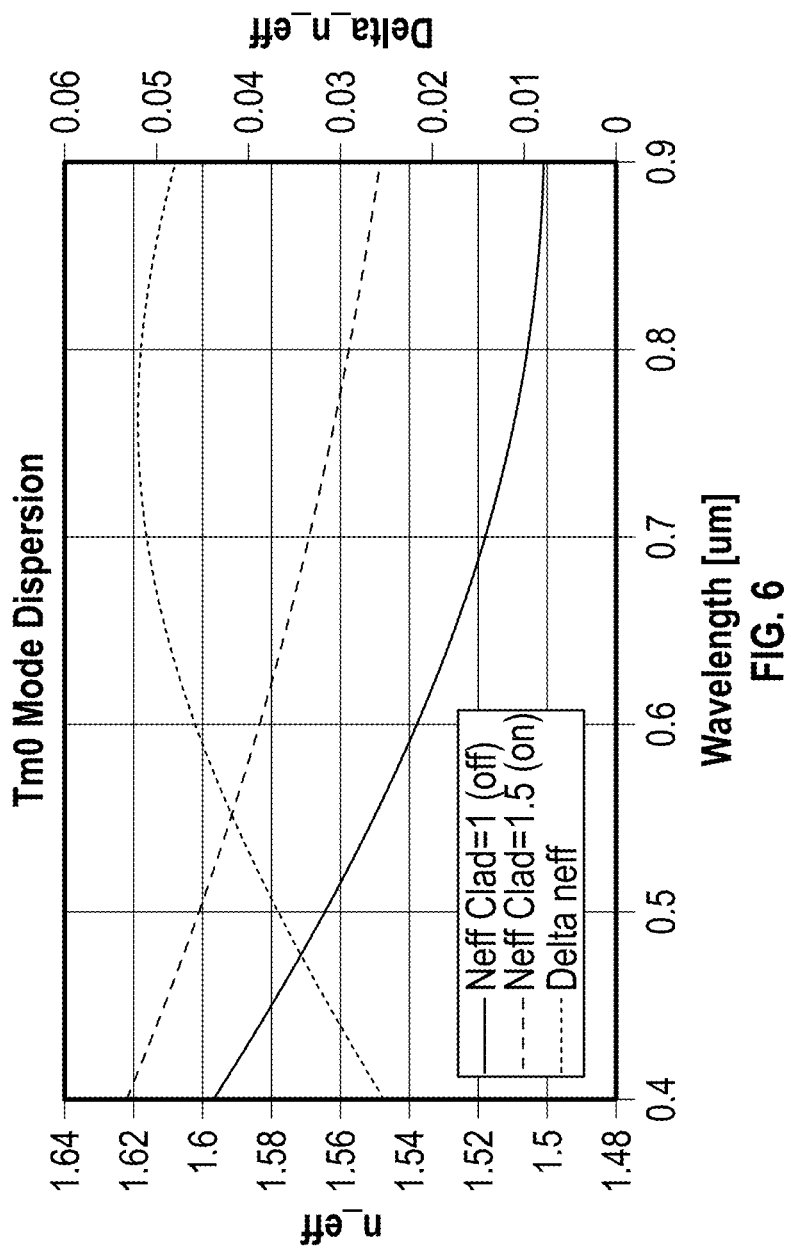
FIG. 6 illustrates effective index of an exemplary waveguide, in accordance with embodiments of this disclosure.

The off state (e.g., the slab is farther away from the waveguide surface as a planar waveguide with an air cladding (for example, $n_{clad}=1$, $n_{core}=1.7$, $n_{sub}=1.5$)) and the on state (e.g., the slab is in closer to the waveguide (contacting the waveguide) as a planar waveguide with a glass cladding (for example $n_{clad}=1.5$, $n_{core}=1.7$, $n_{sub}=1.5$)) may be modeled. FIG. 6 illustrates effective index of an exemplary waveguide, in accordance with embodiments of this disclosure. Examples of the effective refractive index of the off state and on state of the waveguide are plotted in FIG. 6. In some embodiments, for a slab length L, the additional slowing of the light leads to the variable OPD and is characterized by the refractive index difference. For example, the refractive index difference is 0.04. In some embodiments, a target of 400 nm is the finest OPD needed (e.g., for system 100 or 200), the corresponding dielectric slab length is dL=0.4 um/0.04=10 um.

Figure 7:
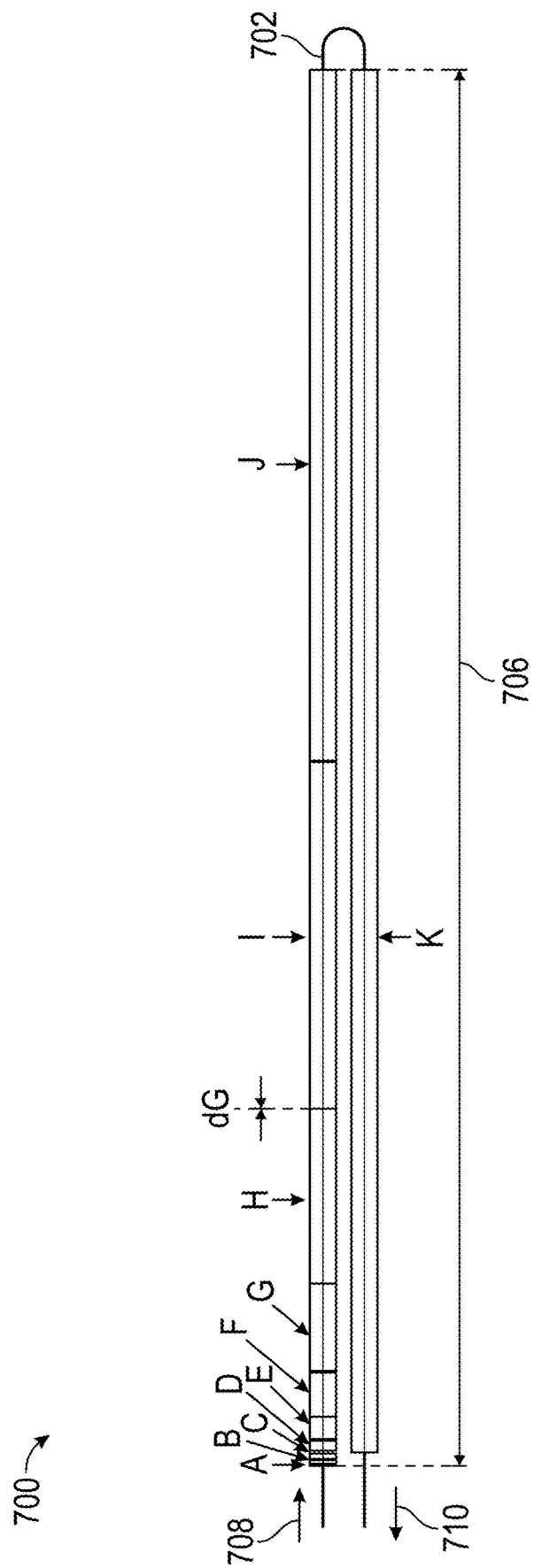
FIG. 7 illustrates an exemplary delay element, in accordance with embodiments of this disclosure.

FIG. 7 illustrates an exemplary delay element assembly 700, in accordance with embodiments of this disclosure. The delay element assembly 700 is configured to receive an optical signal at input 708 and output a delayed version of the input signal at output 710. In some embodiments, the dielectric slab of a disclosed system comprises segments of programmable loading, which creates a programmable delay. For example, the segments are programmed with a binary progression of slab length, such that a digitally controlled OPD may be realized and an amount of delay through the delay element assembly is a binary-selectable number (e.g., with 11 bits of control, a base-2 number). As illustrated in FIG. 7, the line 702 depicts the waveguiding core (e.g., as seen from the top of the delay element assembly 700), and the rectangles A-K depict the waveguide loading slabs of the delay element assembly 700. For example, each of the rectangles A-K represents a delay element 400 or a delay element 500 having a respective slab length. In some embodiments, rectangle A corresponds to one unit length dL, rectangle B corresponds to 2 dL, rectangle C corresponds to 4 dL, rectangle D corresponds to 8 dL, rectangle E corresponds to 16 dL, rectangle F corresponds to 32 dL, rectangle G corresponds to 64 dL, rectangle H corresponds to 128 dL, rectangle I corresponds to 256 dL, rectangle J corresponds to 512 dL, and rectangle K corresponds to 1028 dL. For example, with dL=10 um from the above exemplary calculation, the longest section would be 1024 dL=10.24 mm. In some instances, this length may be longer for an actuating cantilever. Accordingly, in some embodiments, this section is split into smaller sections. In some embodiments, the total length 706 of one arm (e.g., of system 100 or 200) in the configuration in FIG. 7 is 1023 dL+9 dG, where dG is a gap between the modulation sections. For example, if dG=10 um, then the total length is 10.32 mm. In some embodiments, the total available OPD is (211-1)DndL=818.8 um with 11 bits of control.

Figure 8:
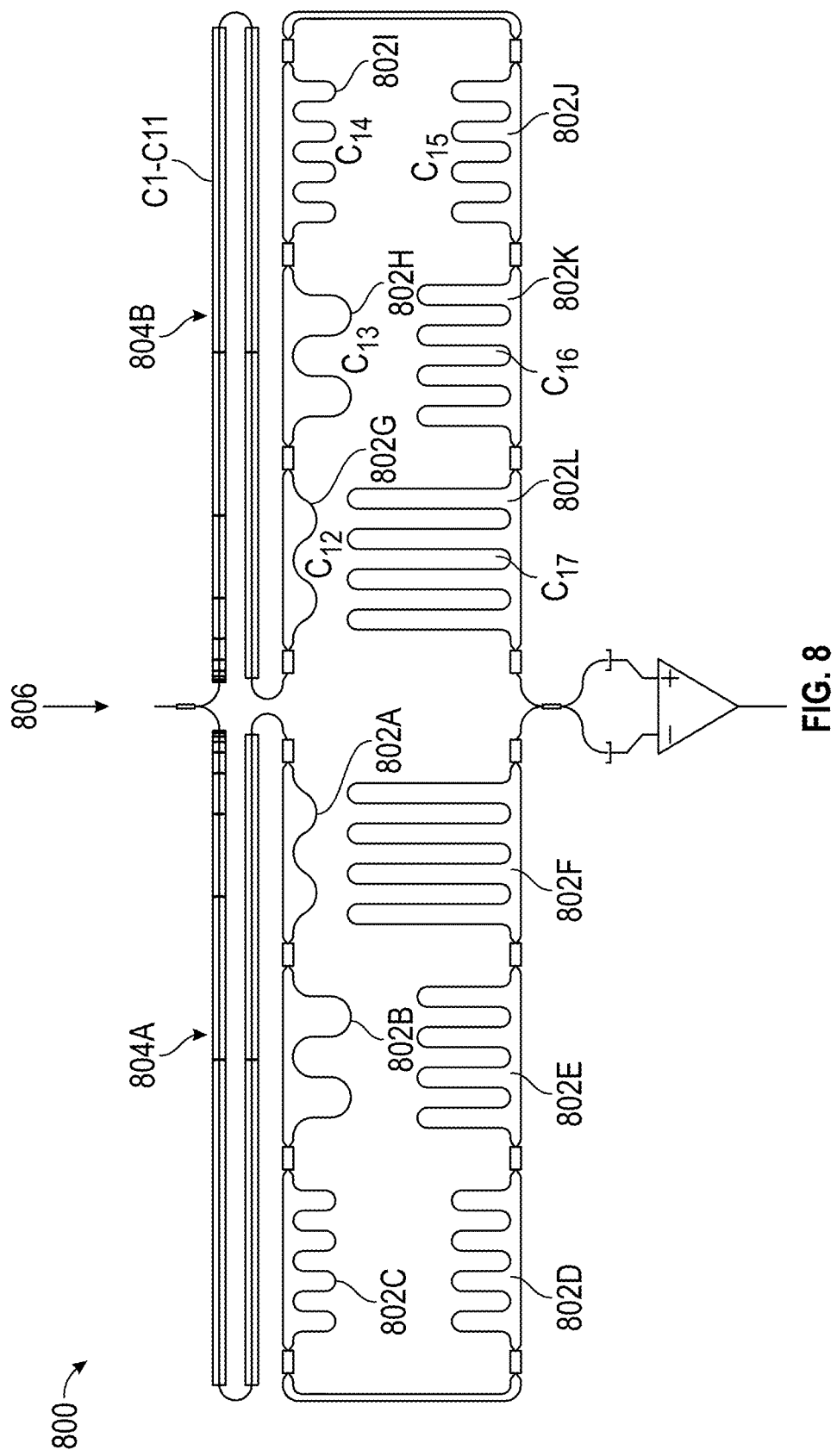
FIG. 8 illustrates an exemplary system, in accordance with embodiments of this disclosure.

FIG. 8 illustrates an exemplary system 800, in accordance with embodiments of this disclosure. In some embodiments, system 800 comprises an FTS. In some embodiments, the OPD generated by the slab programmable time delay (e.g., in 11 bits of resolution) is smaller needed for some applications. In some embodiments, for the additional and longer delays (e.g., upper 6 bits of control), a series of switchable waveguides assembled with Mach-Zehnder switches 802A-802L are coupled to the programmable delay elements 804A and 804B, as illustrated in FIG. 8. In some embodiments, each of delay elements 804A and 804B is delay element assembly 700. For example, using dL as the smallest time delay increment, the total range of time delays is accessed by setting the binary word $\{c_m=1,0\}$ with m=1, 2, ... 17 can be expressed as follows.

$$OPD = Dn\delta L \Sigma_{m=1}^{17} c_m 2^{(m-1)} \qquad (8)$$

In some embodiments, FIG. 8 illustrates an FTS (e.g., FTS 210, FTS 212) that operates on a band (e.g., high band, low band). In some embodiments, an optical signal enters input 806 and is split into left and right arms of an interferometer (e.g., Mach-Zehnder interferometer) by a 1×2 splitter, as illustrated. The splitter is coupled to the programmable delay elements 804A and 804B, which is part of respective waveguide cores, and the delay elements are coupled to the Mach-Zehnder switches 802A-802L. In some embodiments, the Mach-Zehnder switch is configured to create an electric field within the substrate based on an applied voltage to electrodes deposited on the switch, and the electric field consequently changes a refractive index of switch to induce change in the refractive index and different coupling between the switch's ports.

In some embodiments, each arm sees an identical time delay network, each with 17 bits of control (e.g., 11 bits from the delay elements and 6 bits from the switches). In some embodiments, the first section imposes a finer OPD control over the lower 11 bits. In some embodiments, the rectangles on the delay elements represent the switchable dielectric cladding. In some embodiments, as illustrated, the 11$^{th}$ bit has been split into two identical sections of half-length to make the MEMS switching structure less constrained. In some embodiments, the following section is a series of 6 binary switchable OPD, realizing bits 12-17 of control.

In some embodiments, the Mach-Zehnder switches 802A-802L are each configured to either connect the upper input path to the upper output path (through state) or cross them. In this way, the first delay stage marked $C_{12}$ may have a quiescent path (straight) or a delayed path (lower, curved), and so on for the other stages. In some embodiments, the OPD of the quiescent and delayed segment increase exponentially up to the MSB $C_{17}$. In some embodiments, at 650 nm wavelength, the LSB (least significant bit) provides a switchable OPD of 0.4 um and the MSB provides a switchable OPD of 2621.44 um, advantageously providing a wide range of OPD. In some embodiments, if all bits are turned on, the total OPD through one arm is $(2^{17}-1)$ DndL=5242.84 um. In some embodiments, since an identical OPD is realized in the other arm of the interferometer (as illustrated), the total delay is 10485.68 um, which may be twice as what is needed to meet resolution requirements for some space measurement applications.

In some embodiments, the longest path through one arm of the interferometer (e.g., by selecting the maximum delay for each stage) is less than 60 mm. In some embodiments, a metric for the FTS is the loss per unit length of the waveguide, and the loss value is about 0.1~0.2 dB/cm measured at 450 nm for exemplary system 800, so that the insertion loss due to waveguide loss can be advantageously bounded by 1.2 dB.

Figure 9:
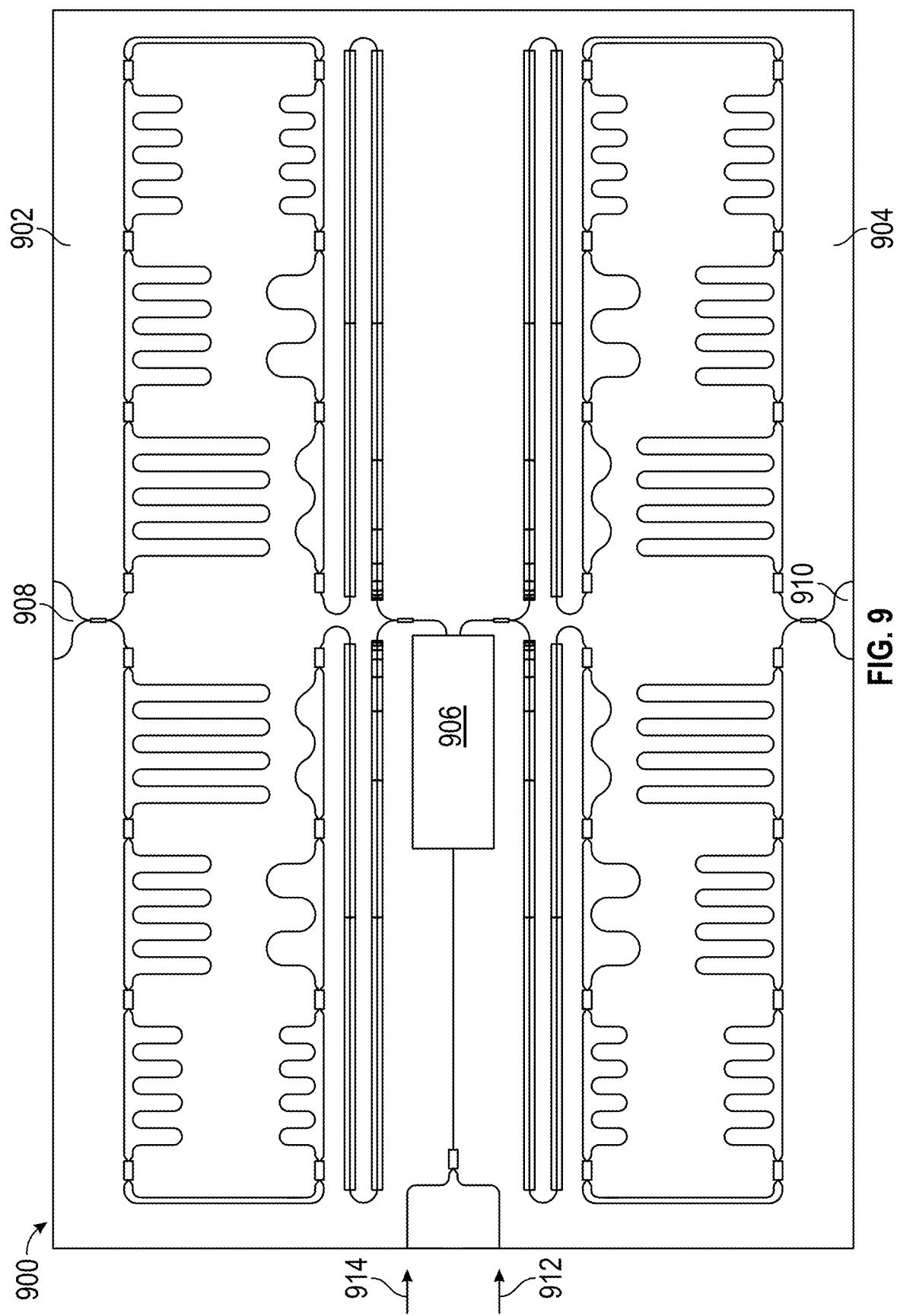
FIG. 9 illustrates an exemplary system, in accordance with embodiments of this disclosure.

FIG. 9 illustrates an exemplary system 900, in accordance with embodiments of this disclosure. In some embodiments, the system 900 comprises FTS 902 and FTS 904, which may correspond to FTS 210 and FTS 212, filter 906, which may correspond to filter 208, and outputs 908 and 910 (which may each couple to an amplifier and subsequently to an ADC, as illustrated in FIG. 2). In some embodiments, the FTS 902 is configured to receive a high band signal and provides an output signal to a detector via output 908. The FTS 904 is configured to receive a low band signal and provides an output signal to the detector or a second detector via output 910.

In some embodiments, the system 900 is configured for one polarization component and operation over an entire band (e.g., low and high band), including the switch configured for selecting between the light from input 912 (e.g., input 202) or that from a laser 914 (e.g., laser 206). In some embodiments, the system 900 measures 13 mm×12.9 mm. In some embodiments, a spectrometer comprises two of system 900 (one for each polarization component). In some embodiments, the high band and low band sections of the system differ in the underlying waveguides that support the propagating modes.

Figure 10:
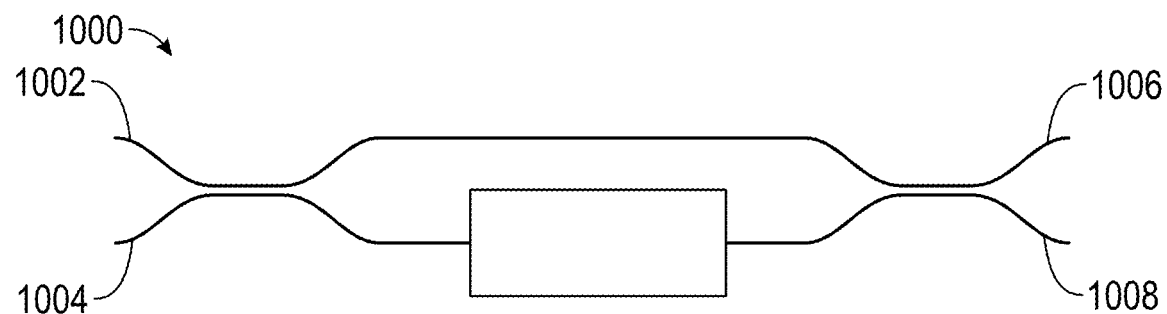
FIG. 10 illustrates an exemplary switch, in accordance with embodiments of this disclosure.

FIG. 10 illustrates an exemplary switch 1000, in accordance with embodiments of this disclosure. In some embodiments, the switch 1000 comprises a Mach-Zehnder switch, and switches associated with coefficients $C_{12}$-$C_{17}$ each comprise the switch 1000. In some embodiments, the switch 1000 comprises an input 1002, a matched load 1004, a first output 1006, and a second output 1008.

In some embodiments, the series of switches 1000 (e.g., switches described with respect to system 800, switches described with respect to system 900) is configured to support a wider bandwidth than required for some applications (e.g., power spectral density measurement for space applications). In some embodiments, since the switch is interferometric in nature, a particular choice of the interferometer length for a particular bandwidth.

Figure 11:
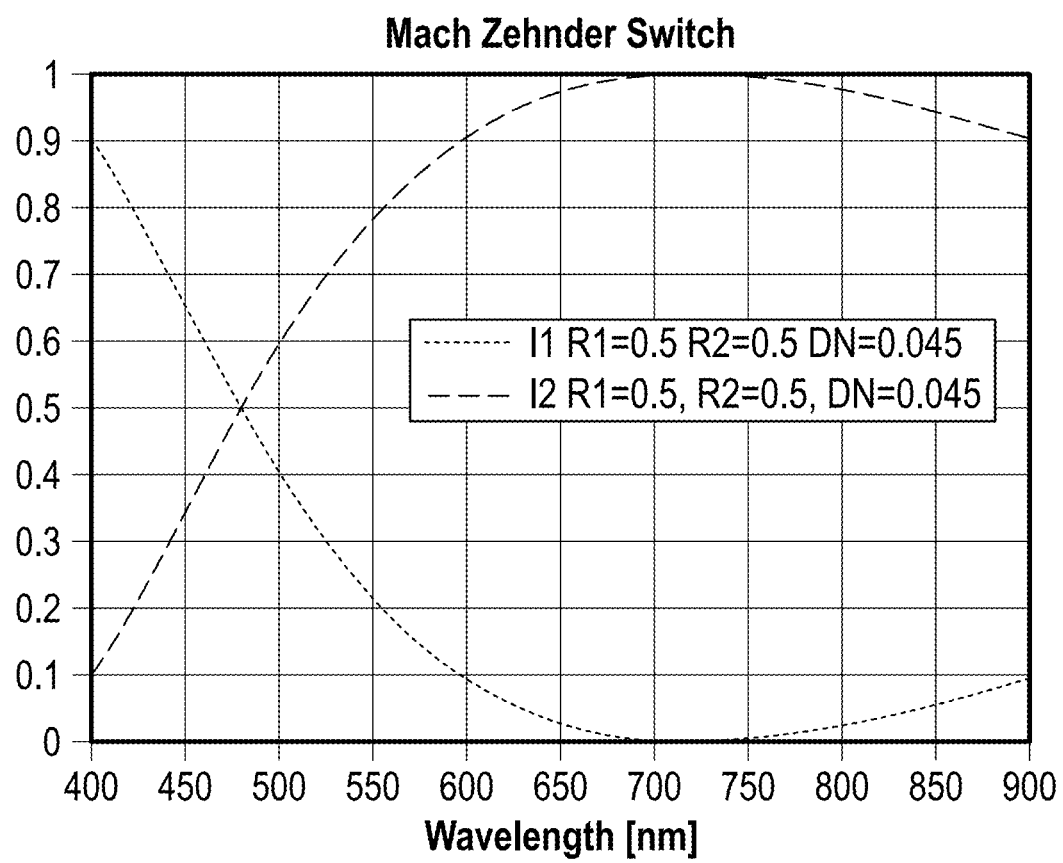
FIG. 11 illustrates outputs of an exemplary switch, in accordance with embodiments of this disclosure.

In some embodiments, the phase modulation acts with a flat spectral response (e.g., Dn is a constant). In some embodiments, if the Mach-Zehnder switch is balanced in the absence of phase modulation Dn=0, then the first output is equal to one and the second output is equal to zero. For the case Ra=Rb=0.5, the response to a phase modulation of Dn=0.045 with a phase modulation segment length L=6.5 um, the bypass (or through) output and exchange (or cross) output are plotted in FIG. 11 as functions of the wavelength. As illustrated, in some embodiments, a complete contrast is achieved at one wavelength (e.g., 700 nm).

In embodiments where the phase modulation term has wavelength dependence, switching characteristics may be made more broadband. In particular, in some embodiments, if Dn(l)=$a_1$+$a_2$*l, where $a_1$ and $a_2$ are constants, then the interference can be extended over a broader bandwidth. In some embodiments, an asymmetric waveguide (e.g., air cladding) with a dielectric section with a gap is loaded between the top of the guide core and the dielectric, which may be achieved by performing the methods disclosed herein. Because the evanescent field of a guided mode extends into the air region with an exponential tail whose extent increases with wavelength, a monotonically increasing phase modulation (with respect to wavelength) may be achieved.

Figure 12:
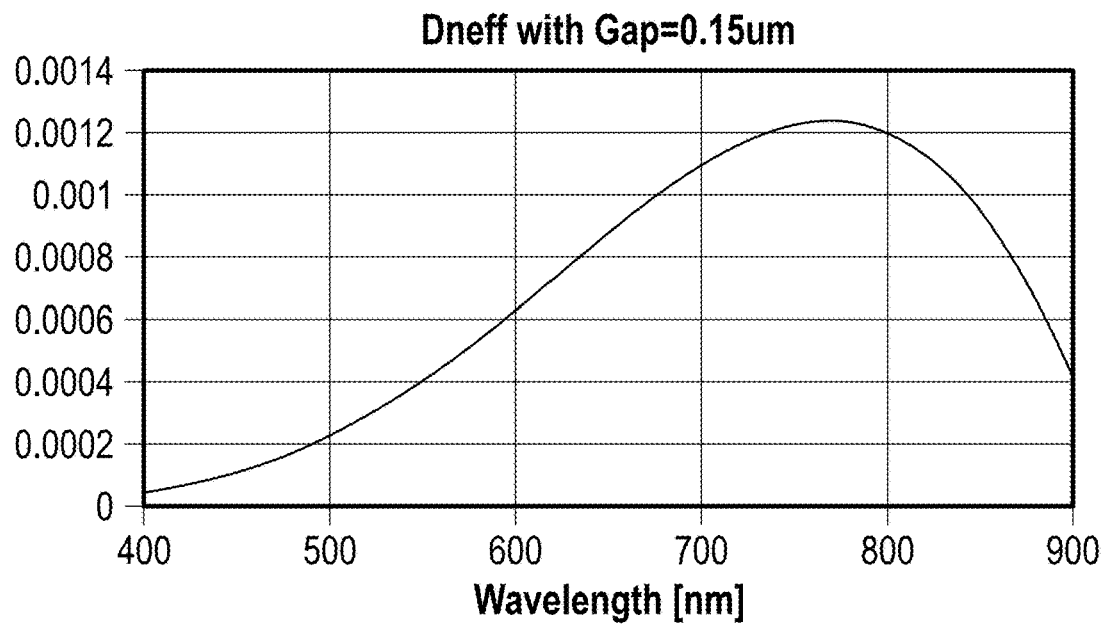
FIG. 12 illustrates net effective index change of an exemplary switch, in accordance with embodiments of this disclosure.

A calculation involving the switchable dielectric loading of the waveguide as a phase modulating section of a Mach-Zehnder switch may show that the gap between the top of the waveguide core and the movable dielectric slab, and the gap may provide an example design parameter for the disclosed system detailed as follows. In some embodiments, a TM0 planar waveguide with the layers (e.g., air cladding, thick n=1.5 dielectric slab, n=1.7 waveguide core and n=1.5 substrate) is analyzed to extract a net effective index change as a function of wavelength, as shown by the example plot of FIG. 12. As illustrated, the index change has a desired increasing behavior with wavelength for most of the band.

Figure 13:
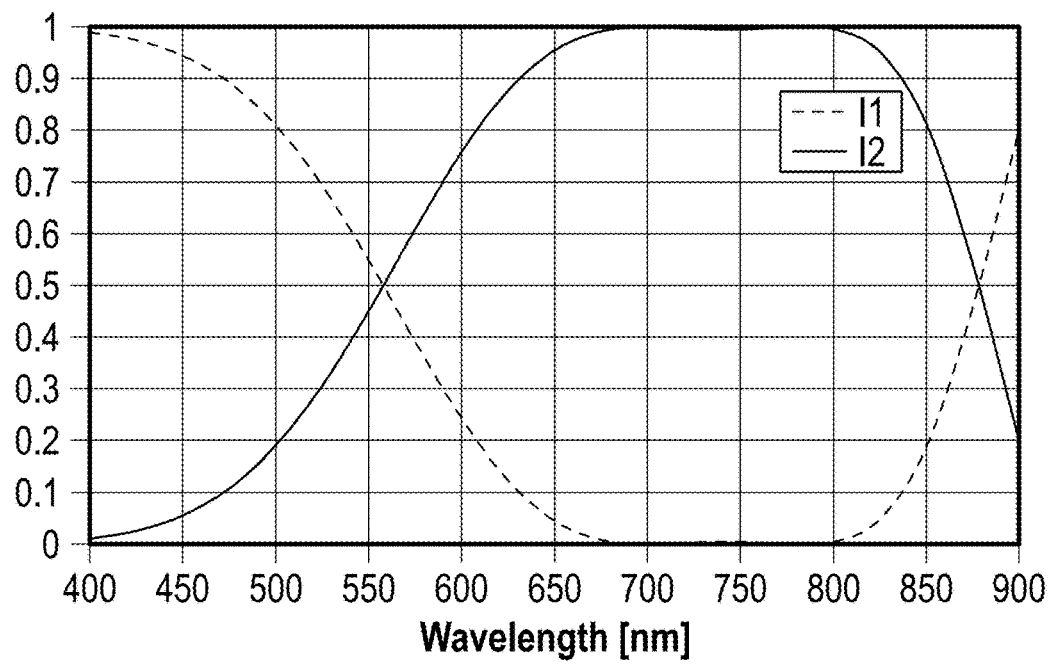
FIG. 13 illustrates net effective index change of an exemplary switch, in accordance with embodiments of this disclosure.

FIG. 13 illustrates net effective index change of an exemplary switch, in accordance with embodiments of this disclosure. For instance, FIG. 13 shows a Mach-Zehnder switch response for the first output (I1) and the second output (I2), which show flatter regions. For example, the planar waveguide geometry associated with FIG. 13 is a n=1.7 guiding layer that is 0.24 um thick on top of n=1.5 substrate. In some embodiments, the cladding is either air (n=1) or a dielectric with n=1.5 with a 0.15 um air gap between the top surface of the guide layer and the cladding. As shown in FIG. 13, the controlled dispersion has a flatter response for this example case. Further optimization may be possible by a combined design of the waveguide geometry as well as the air gap. In some embodiments, the disclosed system comprises two designs—one to cover the low band and the other the high band, with a leakage coefficient of e=0.05 or less within the band.

Post detection processing (e.g., by electronic device 218) may be desirable for the improved operation of an FTS. While the modified inversion of the autocorrelation output of the interferometer as suggested by the equation (6) may be used, in some embodiments, calibration data collected with the laser (e.g., laser 206) that is used as the input are used. In some embodiments, a small leakage in the Mach-Zehnder switch delay lines (e.g., in bits 11-17) may introduce errors in the application of the equation (6). In some embodiments, a requirement for the calibration laser or system of lasers is that the tuning have sub-GHz stability on the time scale of the measurement process. In some embodiments, with the laser output set at one frequency, the FTS is stepped through the entire range of OPD with a dwell time on the order of 100 usec. In some embodiments, there are $2(2^{17}-1)=262,142$ total OPD states so that the entire calibration duration is 26 seconds long, not counting any gaps required for laser tuning to stabilize. In some embodiments, this is repeated for each of the 100,000 frequencies, leading to a of 28-hour calibration period. In some instances, temperature control is a cause of drift in integrated photonics. In some embodiments, because the chip is smaller than bulk realizations of FTS, advantageously, temperature stabilization over long periods of time has a smaller effect on operation of the system.

In some embodiments, as an alternative to application of Equation (6) to invert the measured correlation function into the desired power spectrum, each calibration laser frequency is stepped through the set $\{f_n = f_0 + nDf\}$, n=1, 2, ... N, where $f_0$ is the frequency corresponding to the long wavelength edge (e.g., 900 nm wavelength) and Df is the spacing between the frequency selections. This may allow a set of interferogram for a plurality of frequency from the laser signal having a frequency $f_0$. In some embodiments, as described, each frequency is then measured through the range of OPD to generate a correlation (interferogram) function that can be represented by the array y(m, n) where the first index refers to the OPD selection and second corresponds to the frequency input. In some embodiments, the entire calibration data are compiled into a M×N matrix (e.g., a calibration matrix) with the columns representing the correlation array for each frequency input. In some embodiments, if there were no leakage in the Mach-Zehnder switches that are used in the OPD selections in the bits 11-17 of the FTS, then this matrix can be inverted by a Fourier matrix (e.g., according to Equation (6)). As a result, the power spectral density of an optical signal may be determined. In some embodiments, when there is non-zero leakage, however, some unwanted OPD replicas are included in the data, and the matrix inversion process may not be ideal.

Each of the six sections involved in the OPD selections is the same binary stage that can be investigated to understand whether stability issues may be expected in processing the matrix equation. For example, a single stage can be analyzed, following the illustration in FIG. 14.

Figure 14:
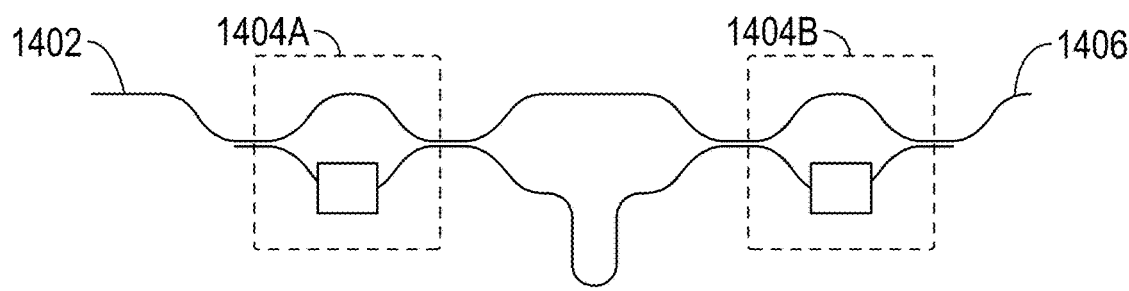
FIG. 14 illustrates an exemplary switch, in accordance with embodiments of this disclosure.

FIG. 14 illustrates an exemplary switch, in accordance with embodiments of this disclosure. In some embodiments, an input signal 1402 is routed to one of two paths marked A and B and is correspondingly routed by the second Mach-Zehnder switch 1404B to the single output port 1406. In an ideal case, the switches 1404A and 1404B would be suitable for all frequencies and depending on the settings of the phase modulator in each switch, the routing is 100% into the desired path. The ideal case can be described as follows. The first Mach-Zehnder switch 1404A takes the input signal 1402 and delivers it to either A or B. The second Mach-Zehnder switch 1404B takes the light in either A or B and routes it to output port 1406. The output is one of two:

Ideal State 1: $z_{ideal}(t)=x(t-t_A)$, Ideal State 2: $z_{ideal}(t)=x(t-t_B)$.

In some embodiments, in the case of non-ideal Mach-Zehnder switches, states 1 and 2 have a mixture of both delays.

Real State 1: $z(t)=a_1a_2 \times (t-t_A)+b_1b_2 \times (t-t_B)$, Real State 2: $z_{ideal}(t)=a_1a_2 \times (t-t_B)+b_1b_2 \times (t-t_A)$, where the coefficients a and b characterize the non-ideal functions of the Mach-Zehnder switches. For example, in particular, $|a|^2 > 0.95$ and $|b|^2 = 1-|a|^2 < 0.05$ over the operational bandwidth of the Mach-Zehnder switch (e.g., the Mach-Zehnder switches are configured to achieve these coefficients). If the coefficients are such that $|a| < 0.5$, an invertible linear transformation on the real state can recover the ideal state. This may provide an underpinning for the overall calibration matrix to lead to a stable inverse (e.g., through singular value decomposition).

Figure 15:
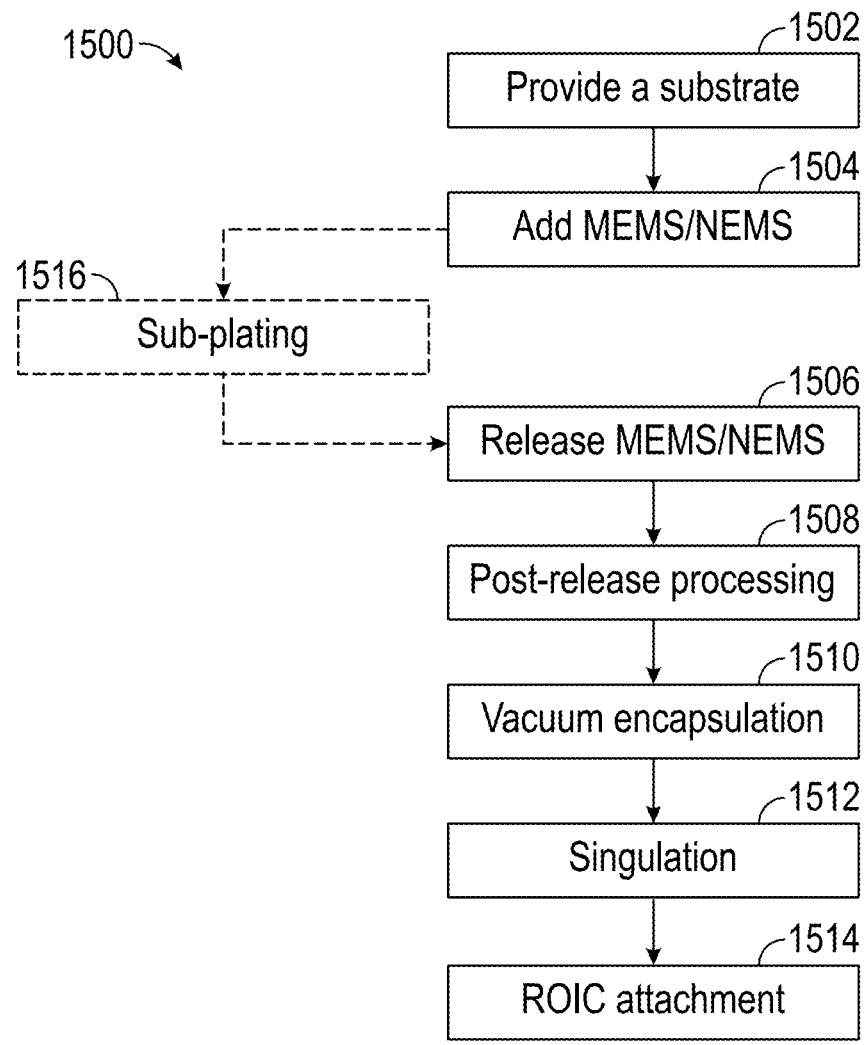
FIG. 15 illustrates a method of manufacturing an electromechanical system, according to embodiments of the disclosure.

FIG. 15 illustrates a method 1500 of manufacturing an electromechanical system, in accordance with an embodiment. As non-limiting examples, the electrochemical system could be associated with the devices or systems (e.g., system 100, system 200, delay element 400, delay element 500, delay element assembly 700, system 800, system 900) described herein. To manufacture an electromechanical system, all or some of the process steps in method 1500 could be used and used in a different order.

Method 1500 includes Step 1502, providing a substrate. In some embodiments, the provided substrate comprises substrate 410 or substrate 508. In some embodiments, the substrate is made of glass. In some embodiments, the substrate is low temperature polycrystalline silicon. In some embodiments, the substrate is a borosilicate that contains additional elements to fine tune properties. An example of a borosilicate is by Corning Eagle™, which produces an alkaline earth boro aluminosilicate (a silicate loaded with boron, aluminum, and various alkaline earth elements). Other variations are available from Asahi Glass™ or Schott™.

In some embodiments, a flat panel glass process is used to manufacture the electromechanical system. In some embodiments, a liquid crystal display (LCD) process is used to manufacture the electromechanical system. In some embodiments, an OLED display process or an x-ray panel process is used. Employing a flat panel glass process may allow for increased substrate sizes, thereby allowing for a higher number of electrochemical systems per substrate, which reduces processing costs. Substrate sizes for "Panel Level" can include 620 mm×750 mm, 680 mm×880 mm, 1100 mm×1300 mm, 1300 mm×1500 mm, 1500 mm×1850 mm, 1950 mm×2250 mm, and 2200 mm×2500 mm. Further, thin film transistors (TFTs) in panel level manufacturing can also reduce cost and so, for example, LCD-TFT processes can be beneficial.

Method 1500 includes Step 1504, adding MEMS to the substrate. Although MEMS is used to describe the addition of structures, it should be appreciated that other structures could be added without deviating from the scope of this disclosure. In embodiments using panel level processing, the MEMS structures may be added using an LCD-TFT process.

Step 1504 may be followed by optional Step 1516, sub-plating. Step 1516 may be used when the substrate is larger than the processing equipment used in subsequent steps. For example, if using a panel level process (such as LCD), some embodiments will include (at Step 1504) cutting the panel into wafer sizes to perform further processing (using, for example, CMOS manufacturing equipment). In other embodiments, the same size substrate is used throughout method 1500 (i.e., Step 1516 is not used).

Method 1500 includes Step 1506, releasing the MEMS from the substrate.

Method 1500 includes Step 1508, post-release processing. Such post-release processing may prepare the MEMS structure for further process steps, such as planarization. In wafer-level processing, planarization can include chemical mechanical planarization. In some embodiments, the further process steps include etch back, where a photoresist is spun onto the topography to generate a more planar surface, which is then etched. Higher control of the etch time can yield a smoother surface profile. In some embodiments, the further process steps include "spin on glass," where glass-loaded organic binder is spun onto the topography and the result is baked to drive off organic solvents, leaving behind a surface that is smoother.

Method 1500 includes Step 1510, vacuum encapsulation of the MEMS structure, where necessary. Vacuum encapsulation may be beneficial to prolong device life.

Method 1500 includes Step 1512, singulation. Some embodiments may include calibration and chip programming, which may take into account the properties of the sensors. Methods described herein may be advantageous in glass substrate manufacturing processes because uniformity in glass lithography capabilities is limited. As a further advantage, glass has a lower thermal conductivity and so a glass substrate can be a better thermal insulator; by manufacturing thin structures separating a bolometer pixel from a glass substrate, embodiments herein may better serve to thermally isolate the glass bolometer pixel from the packaging environment.

Method 1500 may include optional Step 1514, attachment of a readout integrated circuit (ROIC) and flex/PCB attachment. As non-limiting examples, the readout circuits could be associated with devices or systems described herein. Processes and devices described herein may have the further advantage that the area required for signal processing can be much smaller than the sensing area which is dictated by the sensing physics. Typically, sensors are integrated on top of CMOS circuitry, and area driven costs lead to a technology node that is not optimal for the signal processing task. Processes described herein can use a more suitable CMOS and drive down the area required for signal processing, freeing the sensor from any area constraints by leveraging the low cost of FPD (flat panel display) manufacturing. In some embodiments, the ROIC is specifically designed for sensing a specific electromagnetic wavelength (such as X-Rays, THz, LWIR).

Figure 16:
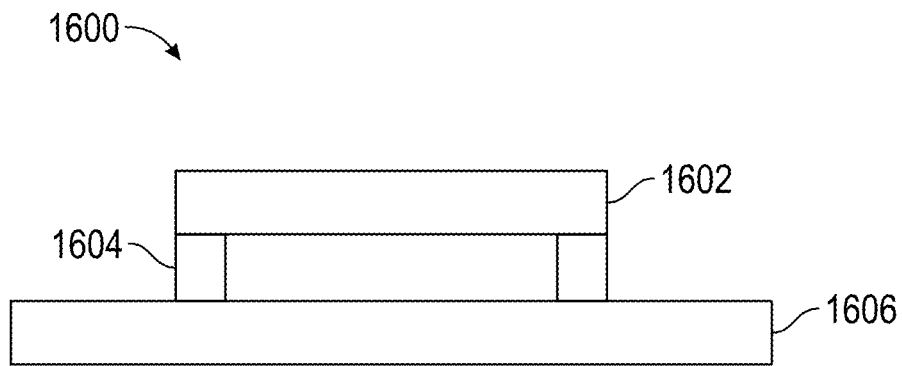
FIG. 16 illustrates an exemplary sensor, according to embodiments of the disclosure.

FIG. 16 illustrates an exemplary sensor. In some embodiments, sensor 1600 is manufactured using method 1600. Sensor 1600 includes glass substrate 1606, structure 1604 less than 250 nm wide coupled to glass substrate 1606, and a sensor pixel 1602 coupled to the structure 1604. In some embodiments of sensor 1600, structure 1604 is a hinge that thermally separates the active area from the glass. In some embodiments, sensor 1600 receives an input current or charge and outputs an output current or charge based on the received radiation (e.g., the resistance between two terminals of the sensor changes in response to exposure to LWIR radiation).

In some embodiments, a sensor includes a glass substrate, a structure manufactured from any of the methods described herein and coupled to the glass substrate, and a sensor pixel coupled to the structure.

In some embodiments, a sensor includes a MEMS or NEMS device manufactured by a LCD-TFT manufacturing process and a structure manufactured by any of the methods described herein.

By way of examples, sensors can include resistive sensors and capacitive sensors. Bolometers can be used in a variety of applications. For example, long wave infra-red (LWIR, wavelength of approximately 8-14 μm) bolometers can be used in the automotive and commercial security industries. For example, LWIR bolometers with QVGA, VGA, and other resolution. Terahertz (THz, wavelength of approximately 1.0-0.1 mm) bolometers can be used in security (e.g., airport passenger security screening) and medical (medical imaging). For example, THz bolometers with QVGA resolution and other resolutions. Some electrochemical systems can include X-Ray sensors or camera systems. Similarly, LWIR and THz sensors are used in camera systems. Some electromechanical systems are applied in medical imaging, such as endoscopes and exoscopes. X-ray sensors include direct and indirect sensing configurations.

Other electromechanical systems include scanners for light detection and ranging (LIDAR) systems. For example, optical scanners where spatial properties of a laser beam could be shaped (for, e.g., beam pointing). Electromechanical systems include inertial sensors (e.g., where the input stimulus is linear or angular motion). Some systems may be used in bio sensing and bio therapeutic platforms (e.g., where biochemical agents are detected).

In some embodiments, a non-transitory computer readable storage medium stores one or more programs, and the one or more programs includes instructions. When the instructions are executed by an electronic device (e.g., system 100, system 200, delay element 400, delay element 500, delay element assembly 700, system 800, system 900) with one or more processors and memory, the instructions cause the electronic device to perform the methods described with respect to FIGS. 1-14.

In some embodiments, a system comprises: a glass substrate; and a FTS comprising: a waveguide disposed on the glass substrate and configured to receive an optical signal, and a delay element, wherein: a first position of the delay element causes a first delay to the optical signal, the first position of the delay element is a first distance from the waveguide, a second position of the delay element causes a second delay to the optical signal shorter than the first delay, the second position of the delay element is a second distance from the waveguide, and the second distance is longer than the first distance.

In some embodiments, the delay element comprises a dielectric slab, and an amount of the first delay is a function of a length of the dielectric slab.

In some embodiments, a center of the dielectric slab is parallel with a center of the waveguide along an axis of the waveguide.

In some embodiments, the system further comprises a second delay element coupled to the first delay element. A first position of the second delay element causes a third delay to the optical signal, and a second position of the second delay element causes a fourth delay to the optical signal.

In some embodiments, the system further comprises a processor and is configured to receive, from a laser, an optical signal having a frequency, wherein the processor is configured to build, based on the optical signal, a set of interferograms for a plurality of frequencies.

In some embodiments, the system further comprises a processor, wherein the processor is configured to: generate a calibration matrix; and determine, based on the calibration matrix, a power spectral density of the optical signal.

In some embodiments, the FTS further comprises a Mach-Zehnder switch coupled to the waveguide, wherein the Mach-Zehnder switch is configured to selectively cause a third delay or a fourth delay to the optical signal.

In some embodiments, the FTS further comprises a second Mach-Zehnder switch coupled to the first Mach-Zehnder switch, wherein the Mach-Zehnder switch is configured to selectively cause a fifth delay or a sixth delay to the optical signal.

In some embodiments, the FTS further comprises a plurality of Mach-Zehnder switches comprising the Mach-Zehnder switch, wherein: an amount of total delay of the optical signal is a binary-selectable value, and each of the plurality of Mach-Zehnder switches is associated with a bit of the binary-selectable value.

In some embodiments, the glass substrate comprises circuitry for controlling a position of the delay element.

In some embodiments, a first electrostatic force causes the delay element to be in the first position, and a second electrostatic force causes the delay element to be in the second position.

In some embodiments, the system further comprises: a filter configured to provide the first optical signal and the second optical signal, wherein the first optical signal is associated with a first band and the second optical signal is associated with a second band; and a second FTS configured to receive the second optical signal.

In some embodiments, the FTS comprises a plurality of delay elements comprising the delay element, wherein: an amount of total delay of the optical signal is a binary-selectable value, and each of the plurality of delay elements is associated with a bit of the binary-selectable value.

In some embodiments, the binary-selectable value comprises eleven bits.

In some embodiments, the system further comprises electrodes for generating a force for causing the delay element to be in the first position or the second position.

In some embodiments, the delay element further comprises a mechanical suspension for supporting the delay element in the first position or the second position.

In some embodiments, the optical signal has a wavelength 400 nm-900 nm.

In some embodiments, the system further comprises: a processor, a second waveguide for receiving the optical signal and providing a second output optical signal, and a second delay element configured to cause a third delay or a fourth delay to the optical signal, wherein: the first waveguide is configured provide a first output optical signal, and the processor is configured to determine a timing difference between the first output optical signal and the second output optical signal.

In some embodiments, the first output optical signal and the second output optical signals are delayed versions of a third optical signal, and the processor is configured to determine, based on the timing difference, a power spectral density of the third optical signal.

In some embodiments, a method for operating a system comprises: a glass substrate; and a FTS comprising: a waveguide disposed on the glass substrate, a first delay element having a first position and a second position, and a second delay element having a first position and a second position, wherein the method comprises: causing the first delay element to be in the first position or the second position, wherein: the first position of the first delay element causes a first delay to the optical signal, the second position of the first delay element causes a second delay to the optical signal, providing, based on the first delay or the second delay, a first output optical signal; causing the second delay element to be in the first position or the second position, wherein: the first position of the second delay element causes a third delay to the optical signal, the second position of the second delay element causes a fourth delay to the optical signal; providing, based on the third delay or the fourth delay, a second output optical signal; determining a timing difference between the first output optical signal and the second output optical signal; and determining, based on the timing difference, a power spectral density of the optical signal.

Although "electrically coupled" and "coupled" are used to describe the electrical or optical connections between two electronic or optical components or elements in this disclosure, it is understood that the electrical or optical connections do not necessarily need direct connection between the terminals of the components or elements being coupled together. For example, electrical routing connects between the terminals of the components or elements being electrically coupled together. In another example, a closed (conducting or an "on") switch is connected between the terminals of the components being coupled together. In yet another example, additional elements connect between the terminals of the components being coupled together without affecting the characteristics of the circuit. For example, buffers, amplifiers, and passive circuit elements can be added between components or elements being coupled together without affecting the characteristics of the disclosed circuits and departing from the scope of this disclosure.

Those skilled in the art will recognize that the systems described herein are representative, and deviations from the explicitly disclosed embodiments are within the scope of the disclosure. For example, some embodiments include additional sensors or cameras, such as cameras covering other parts of the electromagnetic spectrum, can be devised using the same principles.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

We claim:

1. A system, comprising:
   a glass substrate; and
   a Fourier Transform Spectrometer (FTS) comprising:
      a waveguide disposed on the glass substrate and configured to receive an optical signal, and
      a delay element, wherein:
         a first position of the delay element causes a first delay to the optical signal,
         the first position of the delay element is a first distance from the waveguide,
         a second position of the delay element causes a second delay to the optical signal shorter than the first delay,
         the second position of the delay element is a second distance from the waveguide, and
         the second distance is longer than the first distance.

2. The system of claim 1, wherein:
   the delay element comprises a dielectric slab, and
   an amount of the first delay is a function of a length of the dielectric slab.

3. The system of claim 2, wherein a center of the dielectric slab is parallel with a center of the waveguide along an axis of the waveguide.

4. The system of claim 1, further comprising a second delay element coupled to the first delay element, wherein:
   a first position of the second delay element causes a third delay to the optical signal, and
   a second position of the second delay element causes a fourth delay to the optical signal.

5. The system of claim 1, wherein the system further comprises a processor and is configured to receive, from a laser, an optical signal having a frequency, wherein the processor is configured to build, based on the optical signal, a set of interferograms for a plurality of frequencies.

6. The system of claim 1, further comprising a processor, wherein the processor is configured to:
   generate a calibration matrix; and
   determine, based on the calibration matrix, a power spectral density of the optical signal.

7. The system of claim 1, wherein the FTS further comprises a Mach-Zehnder switch coupled to the waveguide, wherein the Mach-Zehnder switch is configured to selectively cause a third delay or a fourth delay to the optical signal.

8. The system of claim 7, wherein the FTS further comprises a second Mach-Zehnder switch coupled to the first Mach-Zehnder switch, wherein the Mach-Zehnder switch is configured to selectively cause a fifth delay or a sixth delay to the optical signal.

9. The system of claim 7, wherein the FTS further comprises a plurality of Mach-Zehnder switches comprising the Mach-Zehnder switch, wherein:

an amount of total delay of the optical signal is a binary-selectable value, and each of the plurality of Mach-Zehnder switches is associated with a bit of the binary-selectable value.

10. The system of claim 1, wherein the glass substrate comprises circuitry for controlling a position of the delay element.

11. The system of claim 1, wherein:

a first electrostatic force causes the delay element to be in the first position, and a second electrostatic force causes the delay element to be in the second position.

12. The system of claim 1, further comprising:

a filter configured to provide the first optical signal and the second optical signal, wherein the first optical signal is associated with a first band and the second optical signal is associated with a second band; and a second FTS configured to receive the second optical signal.

13. The system of claim 1, wherein the FTS comprises a plurality of delay elements comprising the delay element, wherein:

an amount of total delay of the optical signal is a binary-selectable value, and each of the plurality of delay elements is associated with a bit of the binary-selectable value.

14. The system of claim 13, wherein the binary-selectable value comprises eleven bits.

15. The system of claim 1, further comprising electrodes for generating a force for causing the delay element to be in the first position or the second position.

16. The system of claim 1, wherein the delay element further comprises a mechanical suspension for supporting the delay element in the first position or the second position.

17. The system of claim 1, wherein the optical signal has a wavelength 400 nm-900 nm.

18. The system of claim 1, further comprising:

a processor, a second waveguide for receiving the optical signal and providing a second output optical signal, and a second delay element configured to cause a third delay or a fourth delay to the optical signal, wherein:

the first waveguide is configured provide a first output optical signal, and the processor is configured to determine a timing difference between the first output optical signal and the second output optical signal.

19. The system of claim 18, wherein:

the first output optical signal and the second output optical signals are delayed versions of a third optical signal, and the processor is configured to determine, based on the timing difference, a power spectral density of the third optical signal.

20. A method for operating a system comprising:

a glass substrate; and a FTS comprising:

a waveguide disposed on the glass substrate, a first delay element having a first position and a second position, and a second delay element having a first position and a second position, wherein the method comprises:

causing the first delay element to be in the first position or the second position, wherein:

the first position of the first delay element causes a first delay to the optical signal, the second position of the first delay element causes a second delay to the optical signal, providing, based on the first delay or the second delay, a first output optical signal;

causing the second delay element to be in the first position or the second position, wherein:

the first position of the second delay element causes a third delay to the optical signal, the second position of the second delay element causes a fourth delay to the optical signal;

providing, based on the third delay or the fourth delay, a second output optical signal;

determining a timing difference between the first output optical signal and the second output optical signal; and determining, based on the timing difference, a power spectral density of the optical signal.

* * * * *